(12) United States Patent
Mayhall

(10) Patent No.: US 9,372,515 B2
(45) Date of Patent: Jun. 21, 2016

(54) HEAT AND AIRFLOW MANAGEMENT IN A DATA STORAGE DEVICE

(71) Applicant: Evtron, Inc., St. Louis, MO (US)

(72) Inventor: Andrew William Mayhall, St. Louis, MO (US)

(73) Assignee: Evtron, Inc., St. Louis, MO (US)

( * ) Notice: Subject to any disclaimer, the term of this patent is extended or adjusted under 35 U.S.C. 154(b) by 148 days.

(21) Appl. No.: 14/212,767

(22) Filed: Mar. 14, 2014

(65) Prior Publication Data

US 2014/0268546 A1 Sep. 18, 2014

Related U.S. Application Data

(60) Provisional application No. 61/783,577, filed on Mar. 14, 2013.

(51) Int. Cl.
*G06F 1/20* (2006.01)
*G11B 33/12* (2006.01)
*G11B 33/14* (2006.01)

(52) U.S. Cl.
CPC .............. *G06F 1/20* (2013.01); *G11B 33/128* (2013.01); *G11B 33/142* (2013.01)

(58) Field of Classification Search
CPC ...... G06F 1/20; G11B 33/128; G11B 33/142; H05K 7/20709
USPC .............. 361/679.47, 679.49, 690, 693, 694, 361/695, 707
See application file for complete search history.

(56) References Cited

U.S. PATENT DOCUMENTS

| 5,119,270 | A | 6/1992 | Bolton et al. | |
|---|---|---|---|---|
| 5,859,483 | A * | 1/1999 | Kliman | H02K 1/20 310/216.004 |
| 6,563,704 | B2 | 5/2003 | Grouell et al. | |
| 8,276,394 | B2 | 10/2012 | Heydari et al. | |
| 8,574,046 | B2 | 11/2013 | Nishiyama et al. | |
| 2007/0247805 | A1 | 10/2007 | Fujie et al. | |
| 2010/0307171 | A1 | 12/2010 | Hamann et al. | |
| 2011/0176271 | A1* | 7/2011 | Zhang | G06F 1/20 361/679.33 |
| 2013/0258580 | A1 | 10/2013 | Nakayama | |

FOREIGN PATENT DOCUMENTS

| EP | 0 564 119 A2 | 10/1993 |
|---|---|---|
| WO | 2013130004 A1 | 9/2013 |

* cited by examiner

*Primary Examiner* — Tuan T Dinh
*Assistant Examiner* — Mukund G Patel
(74) *Attorney, Agent, or Firm* — Armstrong Teasdale LLP

(57) ABSTRACT

A chassis sub-assembly for computing devices includes a first heat sink plate and a second heat sink plate. The first heat sink plate includes a first plurality of perforations and the second heat sink plate includes a second plurality of perforations. The chassis sub-assembly also includes a first computing device and a second computing device. Each of the first and second computing devices is positioned between the first heat sink plate and the second heat sink plate. The first and second computing devices are in contact with both the first and second heat sink plates, and define a channel gap between the first and second computing devices. At least some of the first and second plurality of perforations are aligned with the channel gap. The first plurality of perforations, the channel gap, and the second plurality of perforations define an airflow channel.

17 Claims, 7 Drawing Sheets

HEAT AND AIRFLOW MANAGEMENT IN A DATA STORAGE DEVICE

CROSS REFERENCE TO RELATED APPLICATIONS

This application claims the benefit of U.S. Provisional Patent Application No. 61/783,577 filed Mar. 14, 2013, which is hereby incorporated by reference in its entirety.

BACKGROUND OF THE DISCLOSURE

The subject matter disclosed herein relates generally to heat sink and air flow technology for computer servers and, more specifically, to a system and method for air cooling data storage drives using thermo-coupled heat sinks and laminar air flow.

Data storage is a key component of the digital world. Storage enclosures or storage servers with multiple data storage devices, for instance hard disk drives, store and provide access to a wide range of content and functionality, everything from digital copies of movies to software programs to healthcare records. Hundreds and even thousands of enclosures are often housed together, in data hosting facilities, in vertical equipment racks capable of holding multiple enclosures or servers.

Servers with multiple data storage devices consume a significant amount of electricity and also generate a significant amount of heat. This heat poses challenges and risks such as, for example, to the operational health of the server, or to the power consumption and cooling of a data hosting facility. If, for example, the temperature of a server or a storage device within a server rises too high, the data storage device may fail. Consequently, data hosting facilities spend a significant amount of money on cooling equipment and electricity.

Server manufacturers have responded in different ways to these challenges. Some known data storage devices are now engineered to reduce the amount of electricity they need to operate and to reduce the heat that they generate. However, in some known systems, the number of data storage devices within a single enclosure (i.e., the "device density" of the enclosure) has been limited to alleviate heat concerns. While this reduces the heat generated within an enclosure, it also limits the storage capacity of the enclosure, and so increases the number of enclosures necessary. As such, the size and expense requirements of the data hosting facilities likewise increase.

BRIEF DESCRIPTION OF THE DISCLOSURE

In one aspect, a chassis sub-assembly for computing devices is provided. The chassis sub-assembly includes a first heat sink plate and a second heat sink plate. The first heat sink plate includes a first plurality of perforations and the second heat sink plate includes a second plurality of perforations. The chassis sub-assembly also includes a first computing device and a second computing device. Each of the first and second computing devices is positioned between the first heat sink plate and the second heat sink plate. The first and second computing devices are in contact with both the first and second heat sink plates, and define a channel gap between the first and second computing devices. At least some of the first and second plurality of perforations are aligned with the channel gap. The first plurality of perforations, the channel gap, and the second plurality of perforations define an airflow channel.

In another aspect, a computer enclosure for computing devices is provided. The computer enclosure includes an enclosure case, and a first and a second chassis sub-assembly positioned within the enclosure case. Each chassis sub-assembly includes a plurality of drives defining an intra-assembly airflow channel spanning a length of each chassis sub-assembly and aligning such as to define an inter-assembly airflow channel through both the first and second chassis sub-assemblies. The computer enclosure also includes one or more fans positioned within the enclosure case and approximately aligned with an axis of the inter-assembly airflow channel.

In yet another aspect, a method for cooling computing devices is provided. The method includes positioning a first computing device between an upstream heat sink plate and a downstream heat sink plate. The downstream heat sink plate includes at least one perforation defining a perforation channel across a width of the perforation. The first computing device includes an interior side. The method also includes positioning a second computing device between the upstream heat sink plate and the downstream heat sink plate. The second computing device includes an interior side. The first and second computing devices are mounted such that the interior side of the first computing device and the interior side of the second computing device define a first channel gap. The channel gap is aligned approximately within the width of the perforation channel. The method also includes directing an airflow through the first channel gap, thereby cooling the first and second computing devices.

BRIEF DESCRIPTION OF THE DRAWINGS

FIG. 1 is a perspective diagram of an example computer chassis, also referred to herein as an enclosure, or a storage enclosure.

FIG. 2 is a front view of two heat sink plates, illustrated with one disposed in front of the other.

FIG. 3 is a perspective view of a chassis sub-assembly that may be mounted in the chassis shown in FIG. 1.

FIG. 4 is a side view of chassis the sub-assembly shown in FIG. 3.

FIG. 5 is a top view of the chassis sub-assembly shown in FIGS. 3 and 4.

FIG. 6 is a perspective view of the chassis sub-assembly shown in FIGS. 3-5 in a partially-populated configuration.

FIG. 7 is a perspective view of the chassis sub-assembly shown in FIGS. 3-6 in a fully-populated configuration.

FIG. 8 is an expanded top view of an airflow channel that traverses between a plurality of heat sink plates (i.e., through their perforations and perforation channels) and between a plurality of storage devices within the chassis sub-assembly shown in FIGS. 3-7.

FIG. 9 is an expanded top view of the airflow channel including the snaking airflow shown in FIG. 8.

FIG. 10 illustrates an exemplary method for cooling computing devices such as storage devices within chassis sub-assembly as shown in FIGS. 1-9.

DETAILED DESCRIPTION OF THE DISCLOSURE

Embodiments of the present disclosure facilitate cooling of computing components within a computer enclosure, such as a plurality of storage devices within storage chassis. In an example embodiment, a plurality of data storage devices are positioned within a chassis sub-assembly. The sub-assembly includes a plurality heat sink plates or blades that separate the storage devices into a plurality of rows, and positioned such that the distance between each plate is approximately the thickness of a storage device. The storage devices are mounted within each row such that a top of the storage device is in contact with one plate and a bottom of the storage device is in contact with another plate, allowing heat to conduct from adjacent drives to the heat sink plates, and vice versa.

Storage devices are positioned relative to each other such as to define an airflow path, or "device channel gap," between two neighboring storage devices within the same row. Further, each of the heat sink plate defines a plurality of perforations, or "perforation channels," that allows air to flow through the plate, i.e., from one row to another. The perforations within the heat sink plates, i.e., the perforation channels, are approximately aligned with the gaps between the devices, i.e., the device gap channels, such that an air stream may pass through the heat sink plates and between the devices.

During operation, storage devices generate heat through operation. This heat is transferred to the heat sink plates. A pressure differential is created at one end of the chassis sub-assembly, such as by a fan blowing into the sub-assembly. The air flow passes through the rows by way of the perforation channels and device flow channels from the front to the rear of the chassis sub-assembly. As the air flow contacts with the storage devices and the heat sink plates, the air becomes heated through convection and/or conduction, i.e., through contact with the storage devices, the heat sink plates, and particularly the walls of the perforations within the heat sink plates. The heated air exits the rear of the chassis sub-assembly and, as such, the air flow removes heat from the storage devices, thereby cooling the storage devices.

As used herein, an element or step recited in the singular and proceeded with the word "a" or "an" should be understood as not excluding plural elements or steps unless such exclusion is explicitly recited. Furthermore, references to "one embodiment" of the present invention are not intended to be interpreted as excluding the existence of additional embodiments that also incorporate the recited features.

Figure 1:
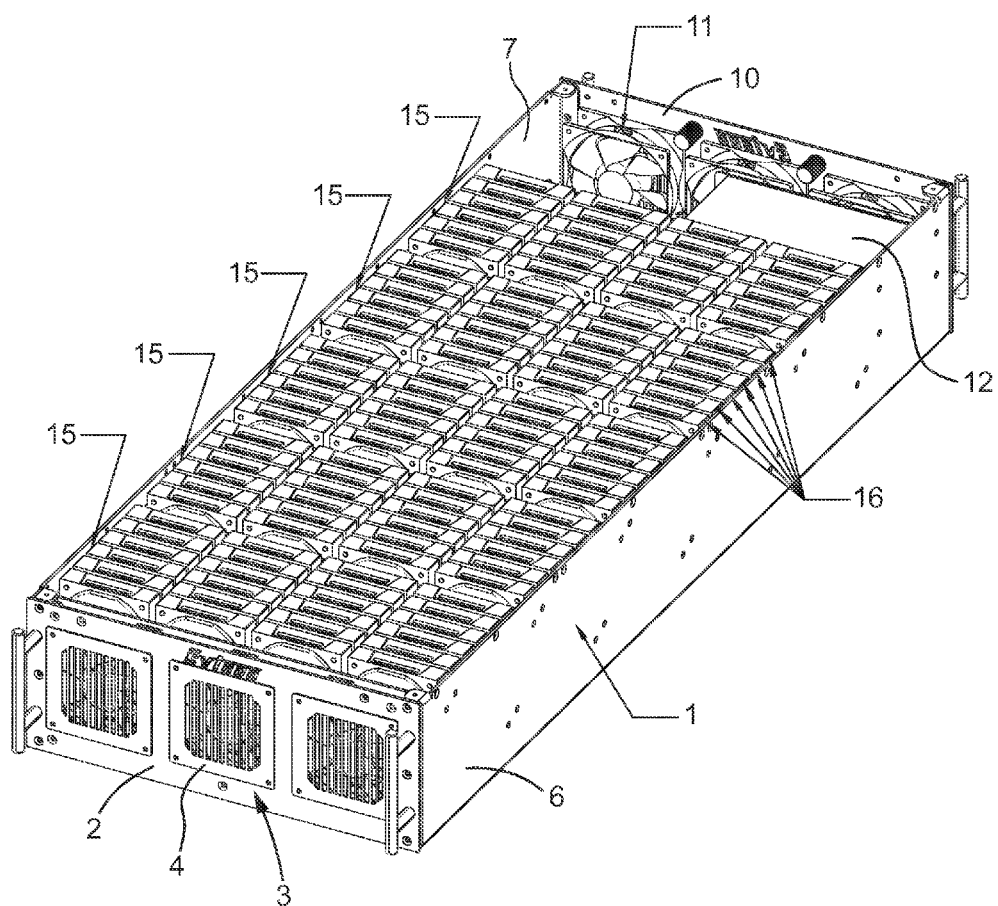
FIGS. 1-10 illustrate example embodiments of the methods and systems described herein, in which like characters represent like parts throughout the drawings.

FIG. 1 is a perspective diagram of an example computer chassis 1, also referred to herein as an enclosure, or a storage enclosure. In the example embodiment, chassis 1 is a rack-mountable chassis sized to fit into a conventional data-center computer equipment rack, such as the common 19-inch or 23-inch rack standards as is known in the art. Further, in the example embodiment, chassis 1 has a height of approximately 4 U (i.e., 4 rack units). It should be understood, however, that other rack sizes and/or heights are possible and within the scope of this disclosure.

In the example embodiment, chassis 1 includes a front end 2, a rear end 10, and chassis side walls 6 and 7. Front end 2 includes a plurality of fans 3, and rear end 10 includes a plurality of fans 11, for generating an air pressure differential and an air flow within chassis 1. In some embodiments, fans 3 and 11 may include a fan plate 4 that includes a plurality of slits or other openings for stabilizing incoming or outgoing air flow. In the example embodiment, front end fans 3 rotate such that they pull air from an area in front of chassis 1 into the interior of chassis 1, and rear end fans 11 rotate such that they pull air from the interior of chassis 1 out to an area outside the rear of chassis 1. As such, fans 3 and 11 contribute to a front-to-rear flow of air through chassis 1. In other embodiments, fans 3 and 11 rotate such as to contribute to a rear-to-front flow of air through chassis 1.

Further, in the example embodiment, chassis 1 includes five chassis sub-assemblies 15. Each chassis sub-assembly 15 includes a plurality of computational devices 16, such as rotational disk drives or solid-state disk drives. In the example embodiment, devices 16 are 3.5" hard disk drives as are known in the art. Each chassis sub-assembly 15 includes a total of twenty-four devices 16, mounted vertically, and oriented in four rows of six devices 16 per row (e.g., in a 4×6 matrix arrangement). It should be understood that other form factor storage devices or other matrix arrangements of devices are possible within the scope of this specification.

Further, in the example embodiment, each row of devices 16 in chassis sub-assembly 15 is separated by a heat sink plate (not shown in FIG. 1). Chassis sub-assemblies 15 and heat sink plates are discussed in greater detail below with regard to FIGS. 2-8.

Chassis sub-assemblies 15 are mounted within chassis 1. More specifically, in the example embodiment, each chassis sub-assembly 15 is mounted within chassis 1 such that an exterior plate (not shown in FIG. 1) of two neighboring chassis sub-assemblies 15 are in contact with each other. Contact between the two exterior plates of neighboring chassis sub-assemblies 15 enables heat to transfer between the two exterior plates. In other embodiments, one or more pairs of chassis sub-assemblies 15 may be disposed with a gap between sub-assemblies 15 such that one or more fans, such as fans 3 and 11, may be included between sub-assemblies 15. As such, interior fans (not shown) may be provided to assist with flow of air between sub-assemblies 15.

In some embodiments, chassis 1 includes one or more circuit boards (not shown in FIG. 1) situated at a bottom of chassis 1 such that computational devices 16 may make electrical contacts with one or more of the circuit boards. For example, the circuit boards may be configured to provide electrical power and data connectivity to storage devices 16 through power and data pathways integrated within the circuit boards. Further, in some embodiments, chassis 1 may include one or more power modules or other computational modules, such as modules 12, which may allow airflow to pass through the module.

Figure 2:
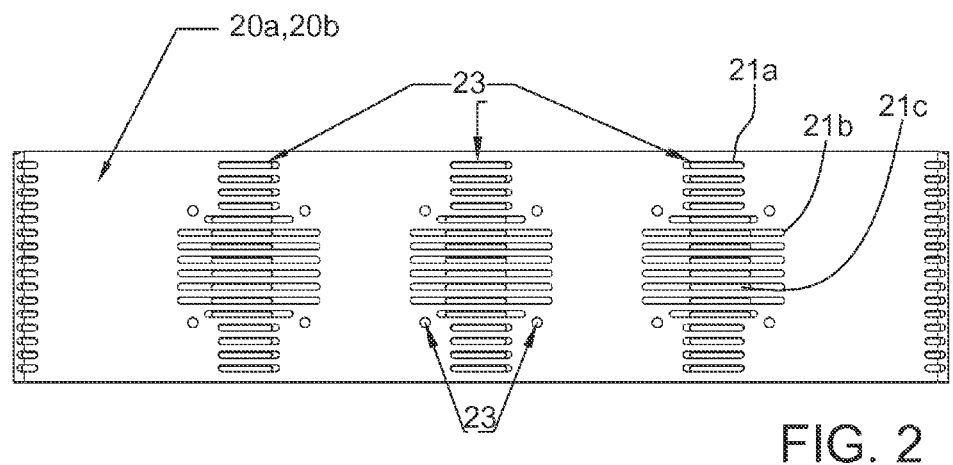

FIG. 2 is a front view of two heat sink plates 20, one disposed in front of the other. An interior heat sink plate 20b is shown, for illustration purposes, positioned behind an exterior heat sink plate 20a. In the example embodiment, each heat sink plate 20 includes a plurality of perforations 21. More specifically, perforations 21 are horizontally aligned, and arranged in a plurality of perforation columns. In each column, exterior heat sink plate 20a includes a plurality of wide perforations 21b, as well as a plurality of narrow perforations 21a, and interior heat sink plate includes a plurality of narrow perforations 21c. Narrow perforations 21a and 12c approximately define, on each plate, a vertical boundary along a left side and a right side.

Further, in the example embodiment, narrow perforations 21a and 21c are similar in size, but are disposed in a slightly shifted alignment. In other words, and for example, the perforation of one plate, such as perforations 21c of interior plate 20b, is shifted slightly to the right of perforations 21a of exterior plate 20a. The offset nature of perforations 21 of consecutive heat sink plates 20 is referred to herein, generally, as "shifting perforations." The significance of shifting perforations is described in greater detail below.

In some embodiments, exterior heat sink plates 20a include mounting holes 23 configured for coupling cooling fans, such as fans 3 and 11 (shown in FIG. 1). In other embodiments, exterior heat sink plates include only narrow perforations 21*a*, and do not include mounting holes 23 or wide perforations 21*b*.

Heat sink plates 20, in the example embodiment, are planar in shape, or plate-like, with the height of each heat sink plate slightly shorter than (e.g., 2-3 millimeters (mm) shorter) the height of chassis 1 (shown in FIG. 1) (e.g., approximately 4 U), and a width of approximately the width of chassis 1 (e.g., 19" or 23"), and a thickness of 0.11 inches. In some embodiments, the thickness of plates 20 are between 0.06 inches and 0.12 inches. In the example embodiment, plates 20 are made of Aluminum and, more specifically, Aluminum alloy (AA) 6063. It should be understood, however, that plates 20 may be manufactured from other heat-conducting materials and/or sheet metals, such as metals, plastic, class, or ceramics, within the scope of this disclosure.

In the example embodiment, perforations 21 are approximately rectangular in shape, but with rounded corners at the ends. Narrow perforations 21*a* and 21*c* are approximately ⅛ inches (0.125 inches) high and 1.0 inches wide. Further, perforations 21 are separated from each other by approximately ⅛ inches (0.125 inches). In some embodiments, wide perforations 2 lb have similar height and separation distances to narrow perforations 21*a* and 21*c*, but have a width of approximately the width of a computer fan that may be mounted to plate 20. However, it should be understood that other heights, widths, and separation distances of perforations 21 are possible within the scope of this disclosure.

In some embodiments, perforations may be formed with other shapes and/or alignments, such as vertically oriented perforations, diagonally oriented perforations, cylindrical perforations, slot-shaped perforations, irregularly shaped perforations, or a plurality of circular holes. Combinations of different shapes may be used as well.

In operation, the columns of perforations 21 align with device channel gaps (i.e., the gaps between devices 16) (not shown in FIG. 2), and act as the perforation channels as described above, allowing air flows to pass through plates 20. Alignment of devices 16 as to perforations 21 is described in greater detail below.

Figure 3:
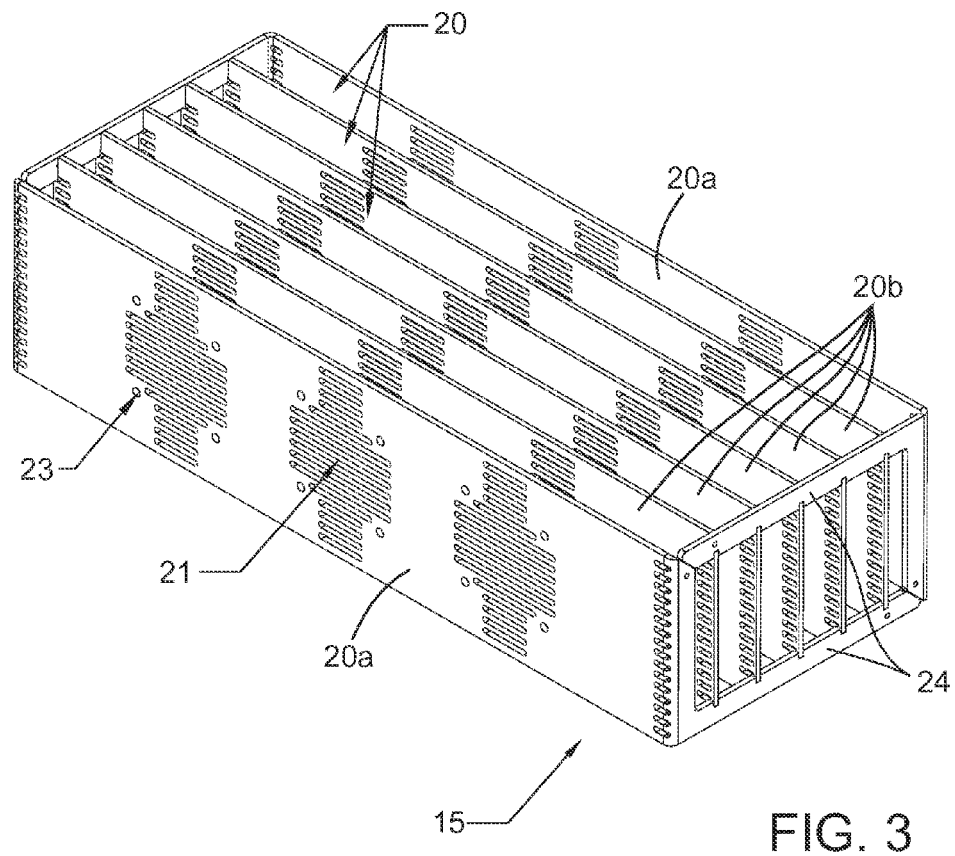

FIG. 3 is a perspective view of a chassis sub-assembly 15 that may be mounted in chassis 1 (shown in FIG. 1). Chassis sub-assembly 15 is slightly narrower than chassis 1 such that chassis sub-assembly 15 may be inserted into chassis 1 in the orientation as shown in FIG. 1. In the example embodiment, chassis sub-assembly 15 is shown fully assembled but prior to installation of computing devices 16 (shown in FIG. 1) and prior to mounting into chassis 1. Chassis sub-assembly 15 includes seven heat sink plates 20, including two exterior heat sink plates 20*a* and five interior heat sink plates 20*b*. In some embodiments, exterior heat sink plates 20*a* may be replaced with interior heat sink plates 20*b*. Further, in some embodiments, perforations 21 of plates 20 are offset, or shifted, as compared to neighboring plates. In other words, perforations 21*a* and 21*c* (shown in FIG. 2) between neighboring plates may not exactly align, as described in greater detail below in reference to FIG. 9.

In the example embodiment, sub-assembly 15 includes top and bottom mounting brackets 24 on each end. Each mounting bracket includes a plurality of notches, each notch configured to insertably-couple with an upper or lower corner or edge of plate 20. Further, the notches of brackets 24 are oriented such that the distance between notches is approximately the thickness of device 16. In other words, the notches determine the distance between the plates (i.e., the gap width of each row), which is the space in which storage devices 16 will reside during operation.

Figure 4:
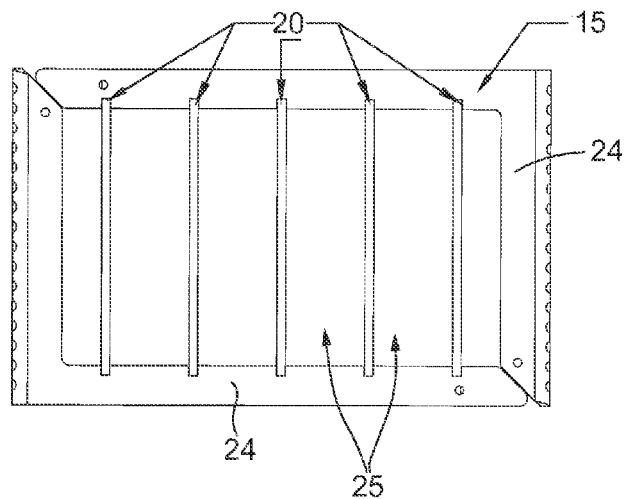
Figure 5:
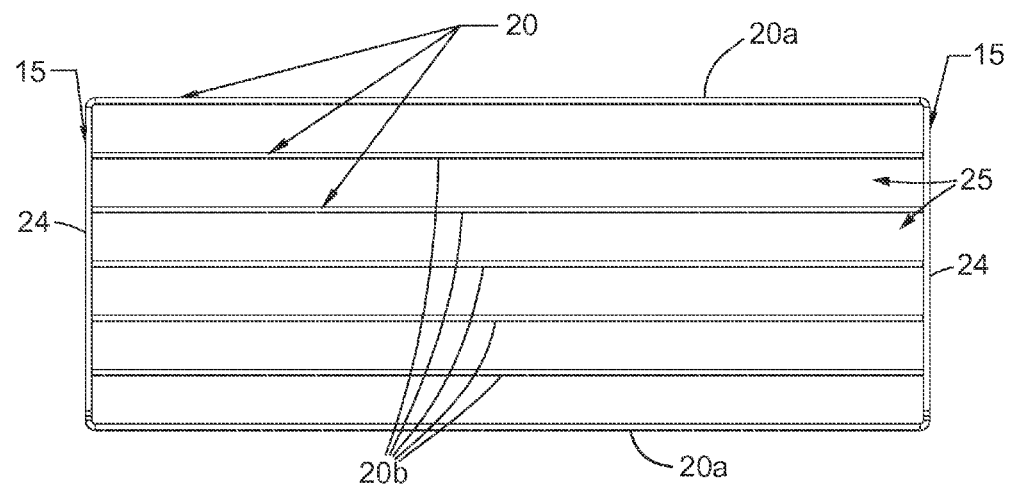

FIG. 4 is a side view of chassis sub-assembly 15. FIG. 5 is a top view of chassis sub-assembly 15. In the example embodiment, chassis sub-assembly 15 is shown fully assembled but prior to installation of computing devices 16 (shown in FIG. 1) and prior to mounting into chassis 1. Chassis sub-assembly 15 includes a plurality of heat sink plates 20, including two external heat sink plates 20*a* and five internal heat sink plates 20*b* coupled to mounting brackets 24, thereby defining vertical rows 25, between each pair of plates 20. During operation, computing devices 16, such as disk drives, may be disposed or mounted in rows 25 as described in greater detail below.

Figure 6:
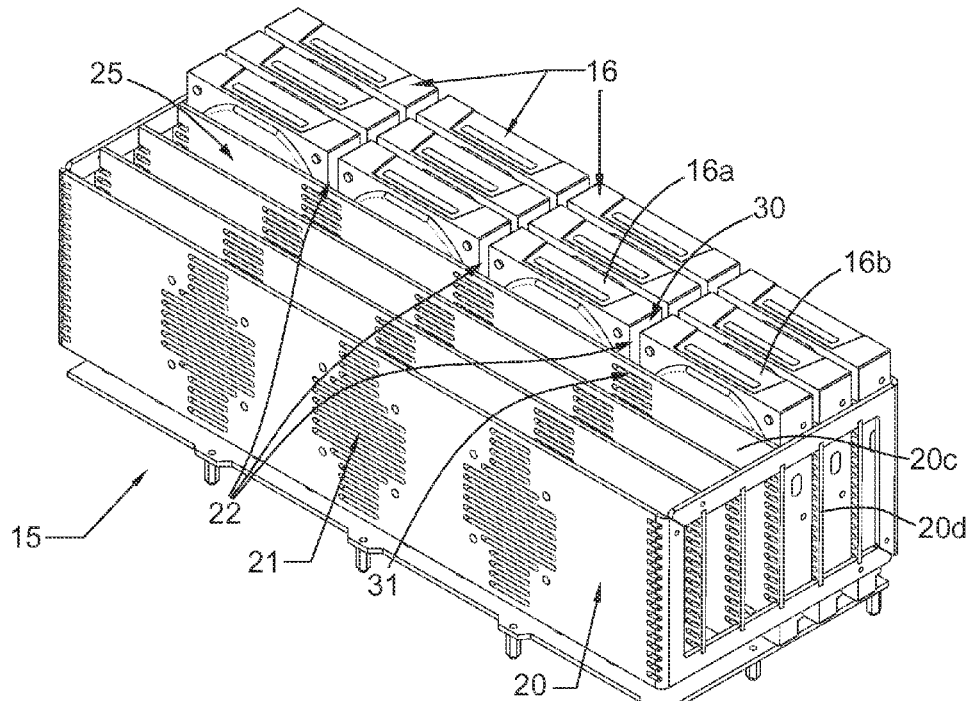
Figure 7:
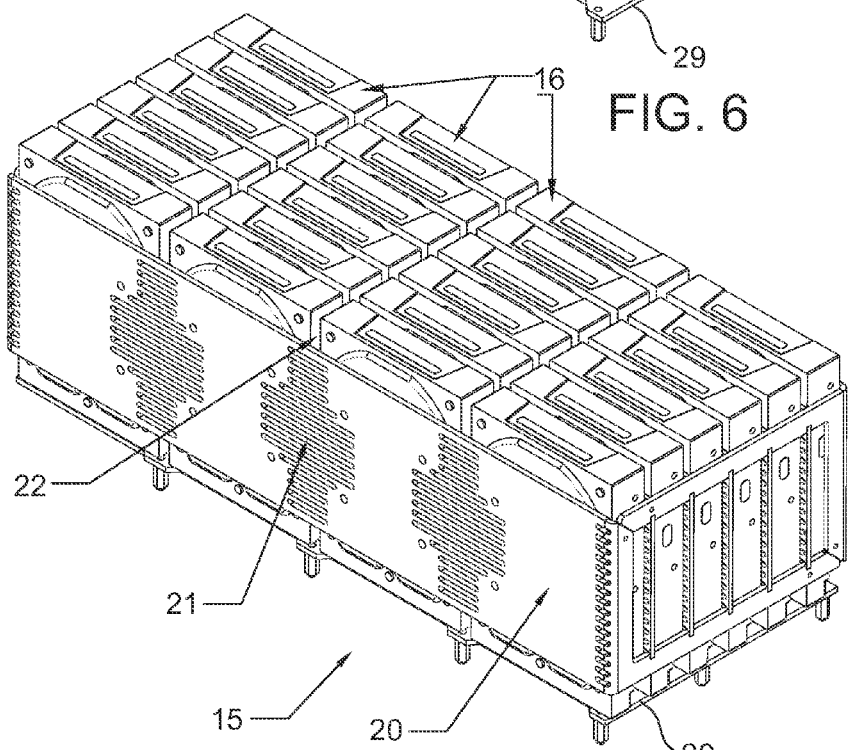

FIG. 6 is a perspective view of a chassis sub-assembly 15 in a partially-populated configuration. FIG. 7 is a perspective view of a chassis sub-assembly 15 in a fully-populated configuration. In the example embodiment shown in FIG. 6, three rows 25 of sub-assembly 15 are populated with data storage devices 16, four devices 16 per row. FIG. 7 illustrates all six rows 25 fully populated with devices 16.

In the example embodiment, devices 16 are inserted or mounted (i.e., installed) into a slot without the use of mounting brackets or screws. Devices 16 are in physical contact with neighboring plates 20. As such, devices 16 may be removably inserted or coupled to chassis sub-assembly 15 by one or more of pressure from adjoining plates 20 and the seating of devices 16 into circuit board 29 (e.g., by way of a power and/or data connector at the base of device 16).

Further, in the example embodiment, devices 16 are approximately aligned with each other in a columnar fashion (e.g., in columns of 6, as shown in FIG. 7). Between each two neighbor devices, such as devices 16*a* and 16*b*, the proximate edges (sometimes referred to herein as "interior edges") of each device 16*a* and 16*b* define a device channel gap, or gap 30, between the two devices 16*a* and 16*b*. This gap 30 defines a channel or vacancy down the full length of devices 16*a* and 16*b* that is referred to herein, generally, as a device channel gap, or just a channel gap. Further, in the example embodiment, devices 16*a* and 16*b* and gap 30 adjoin a neighboring heat sink plate 20*c* that includes perforations that define a perforation channel 31. An airflow channel 22 is thereby formed by the perforations in heat sink plates 20 (e.g., perforation channel 31), such as the perforations in plate 20*c*, in conjunction with the device channel gap, such as gap 30, between neighboring devices, such as devices 16*a* and 16*b*. During operation, air flows through airflow channel 22, absorbing heat from devices 16 and heat sink plates 20 as the air transits from the high pressure side to the low pressure side of sub-assembly 15.

Figure 8:
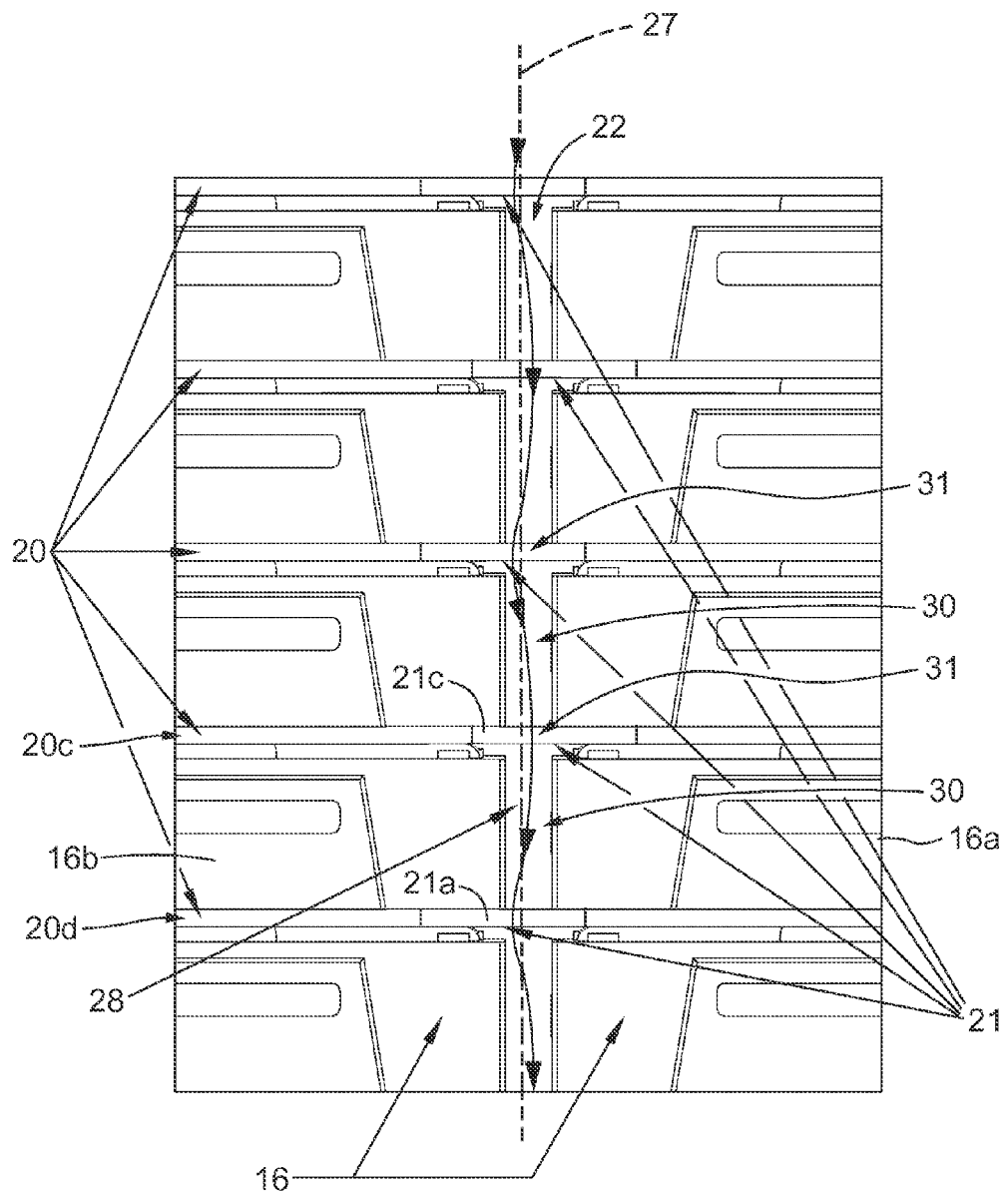

FIG. 8 is an expanded top view of an airflow channel 22 that traverses between a plurality of heat sink plates 20 (i.e., through their perforations 21 and perforation channels) and between a plurality of storage devices 16 within chassis sub-assembly 15 (shown in FIGS. 3-7). In the example embodiment, storage devices 16 are approximately aligned with each other, and are mounted between neighboring heat sink plates 20 such that each device 16 makes contact with the two neighboring plates 20 (e.g., device 16*b* is mounted between plates 20*c* and 20*d*). Further, devices 16 are mounted such that a gap 30 of open space is left between neighboring devices (e.g., gap 30 is created between devices 16*b* and 16*a*).

Further, in the example embodiment, heat sink plates 20 include perforations 21. In the example embodiment, perforations 21 are aligned with airflow channel 22. In other words, perforations 21 are aligned such that the edges of perforations 21 do not protrude into the flow of air within the airflow channel 22.

In some embodiments, perforations 21 are approximately aligned with each other. In the example embodiment, perforations 21 are staggered or shifted relative to one another. In other words, a particular plate's perforations 21 are shifted slightly to the left or right relative to the perforations one or more of its neighbor plates, and based on a flow path down channel 22 and, more specifically, based on a longitudinal axis 27, sometimes referred to herein as a "channel gap axis," or just "center axis," running down the center of channel 22. (In three dimensions, channel 22 defines an axial plane 27 running down the center of channel 22.) For example, plate 20d includes perforation 21a which is shifted to the left of center axis 27 of airflow channel 22. The upstream neighbor of plate 20d is plate 20c, which includes a perforation 21c that is shifted slightly to the right of center axis 27 of airflow channel 22. In some configurations, this shifting pattern causes a snaking effect of the airflow passing through airflow channel 22.

During operation, gaps 30 (i.e., channel gaps) and perforations 21 (i.e., perforation channels 31) combine to form airflow channel 22, which enables a flow of air to pass through chassis sub-assembly 15. In some embodiments, airflow channel 22 enables a laminar airflow with pockets of turbulence that facilitate greater convection and/or conduction of heat from devices 16 and plates 20 into the air. In some embodiments, the staggering of creates a snaking airflow as shown in FIG. 8.

Figure 9:
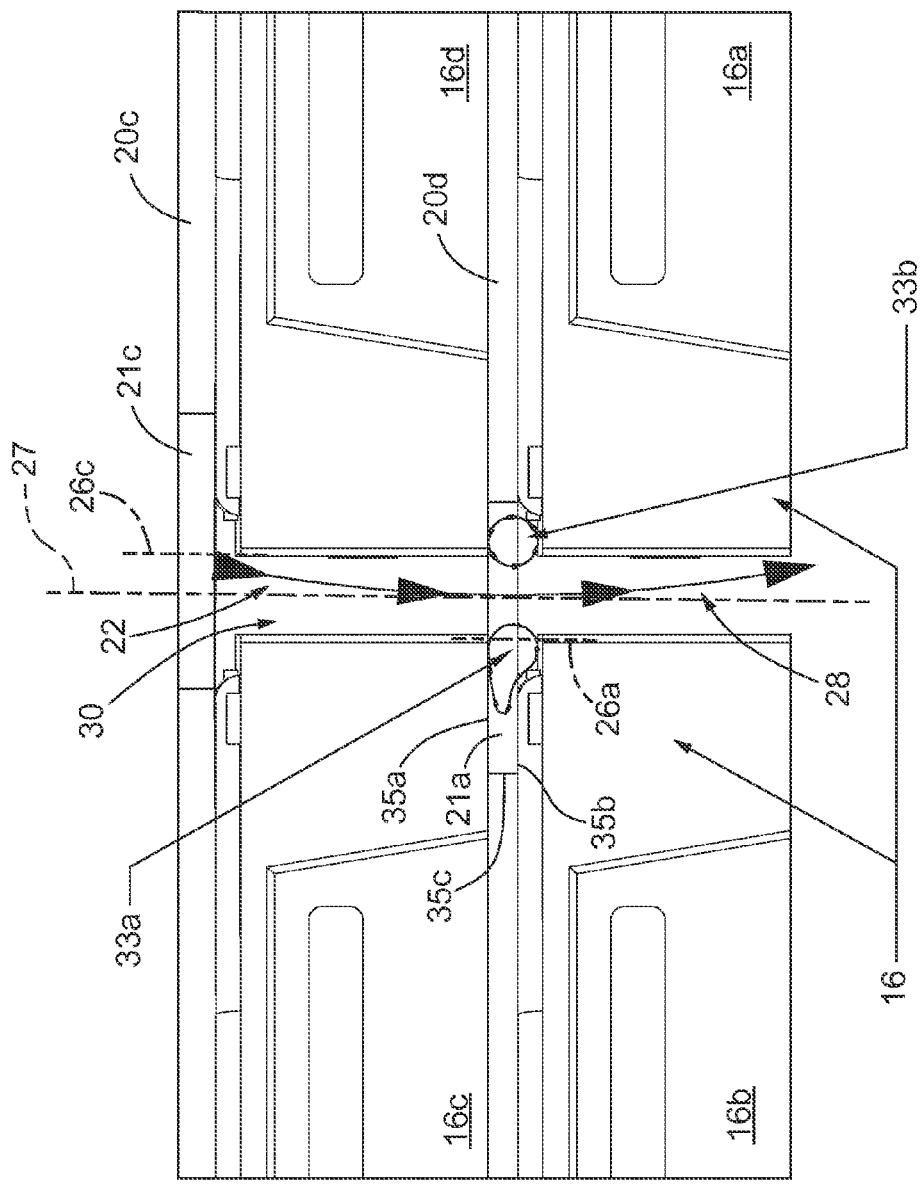

FIG. 9 is an expanded top view of the airflow channel 22 including the snaking airflow 28 shown in FIG. 8. As described above, devices 16 define a device gaps 30 and perforations 21 through which airflow 28 passes. Further, in the example embodiment, neighboring corners of two devices 16 form a pocket or area in which eddies 33 of air may form and circulate. For example, neighboring corners of devices 16c and 16b, along with an adjoining portion of perforation 21a, allow eddy 33a to circulate a turbulent airflow through available gaps. Similarly, neighboring corners of devices 16a and 16d, along with an adjoining portion of perforation 21a, allow eddy 33b to form and circulate an airflow through available gaps.

In the example embodiment, airflow 28 enters gap 30 at an off-parallel angle relative to a center axis 27 defined by gap 30. In other words, airflow enters gap pointed slightly toward the eddy pool 33a and slightly away from eddy pool 33b. In some embodiments, this angulation or shifting of airflow 28 is facilitated or enhanced by the staggering of perforations 21, as described above. For example, in FIG. 9, the right-shifted perforation 21c tends to pull airflow 28 slightly to the right as airflow 28 traverses through perforation 21c. Similarly, as airflow 28 continues down airflow channel 22 toward perforation 21a, the left-shifted nature of perforation 33a tends to pull airflow 28 back to the left of channel 22. In some embodiments, one or more perforations define a center axis of the perforations, sometimes referred to herein as a perforation axis 26, such as axis 26c of perforation 21c and axis 26a of perforation 21a. The perforation axis may be shifted a distance to the right or left of center axis 26. For example, perforation axis 26c is shifted to the right of center axis 27, and perforation axis 26a is shifted to the left of center axis 27. As such, the snaking effect of airflow 28 is created or enhanced.

Further, eddy pools 33a and 33b are defined between an upstream and a downstream neighboring device, and within a portion of a perforation. For example, perforation 21a includes an eddy 33a defined by a downstream side 35a or corner of device 16c, an upstream side 35b or corner of device 16b, and an interior space defined by a portion of perforation 21a defined by the top and bottom walls of perforation 21a and a perimeter edge 35c of perforation 21a. Eddy 33b is defined similarly, but between devices 16a and 16d. Because perforation 21a is left-shifted, the inlet or pocket of eddy 33a is deeper than the pocket of eddy 33b.

The off-parallel directional vector of airflow 28, in the example embodiment, causes airflow 28 to be directed approximately toward eddy 33a. Further, perforation 21a is left-shifted such that perforation 21a presents a deeper recession (e.g., a larger gap between devices 16c and 12b). This directed-angle flow serves to push more air toward and into the deeper recessions because of the angle of approach.

During operation, as air separates from airflow 28 and circulates through eddies 33, additional heat is transferred from both the neighboring corners of devices (e.g., 16b and 16c), as well as from the additional exposed surface areas of the perforations of the heat sink plates (e.g., 21a of plate 20d). The combination of the vector of airflow 28 as it approaches eddy 33a, along with the deeper recession presented by 33a enables eddy 33a to circulate a greater amount of air deeper into perforation 21a (as illustrated by the bulged circulation of eddy 33a), thereby exposing more surface area of devices (e.g., 16c and 16b) and heat sink plates (e.g., 20d) to higher velocity circulation. As the eddy air becomes heated, it passes this heat through to the main stream of airflow 28, thereby moving heat away from the devices 16 and heat sink plates 20. In other words, the perforations through the heat sink plates increase the surface area of the heat sink plates that comes in contact with the ambient atmosphere, further improving their ability to dissipate the absorbed heat. Because of the configurations of the perforations, portions of the airflow 28 tend to be turbulent. As air circulates in the small pockets or eddies 33, the air absorbs a greater amount of heat from the heat sink plates, thereby drawing heat out and into the main airflow 28.

In contrast, a non-shifted embodiment (e.g., aligned perforations, not shown) with a more axial flow (e.g., no snaking effect) is less likely to generate eddies 33 than the examples described above because the flow becomes laminar down the center of gap 30 and thus interacts less with the hot surface areas of devices 16 and heat sink plates 20. To the extent that eddies are formed, their rotational velocities are limited as compared to the snaking embodiments because the vector angles of flow as they approach are approximately parallel to the surfaces of neighboring devices. In other words, the air stream tends to slip past the eddy pockets rather than be forced into them.

During overall operation, using the example embodiments shown in FIGS. 1-9, data stored on storage devices 16 is accessed, thereby heating the devices 16. Fans such as fans 3 and 11 (shown in FIG. 1) are engaged to create a pressure differential between a front end and rear end of chassis 1, thereby generating a flow of cool air through chassis 1. More specifically, a plurality of airflows 28 are forced through airflow channels 22 in a snaking flow. As airflows 28 pass through chassis 1 and the plurality of chassis sub-assemblies 15, air is heated by exposure to surfaces of devices 16 and heat sink plates 20 as described above.

Further, in some situations, only a subset of the storage devices 16 may be in active use (i.e., generating more heat), where the other devices are relatively idle (little or no heat). As the in-use storage devices heat up, part of this heat is transferred through thermal coupling to the two neighboring heat sink plates on either side of the storage device (e.g., plates 20c and 20d of device 16b). Further, if an in-use device (e.g., device 16b) is proximate a device that is not in use (e.g., device 16a), a heat disparity is created. The heat sink plates 20 transfer a portion of the heat it has absorbed to the storage devices not in use, effectively utilizing the storage devices themselves as additional heat sinks. As such, heat generated by in-use storage devices is both transferred to the heat sink plates, to the not-in-use devices, and eventually to the airflow. The heated airflow is then expelled or drawn out of the chassis 1 into the surrounding environment.

Figure 10:
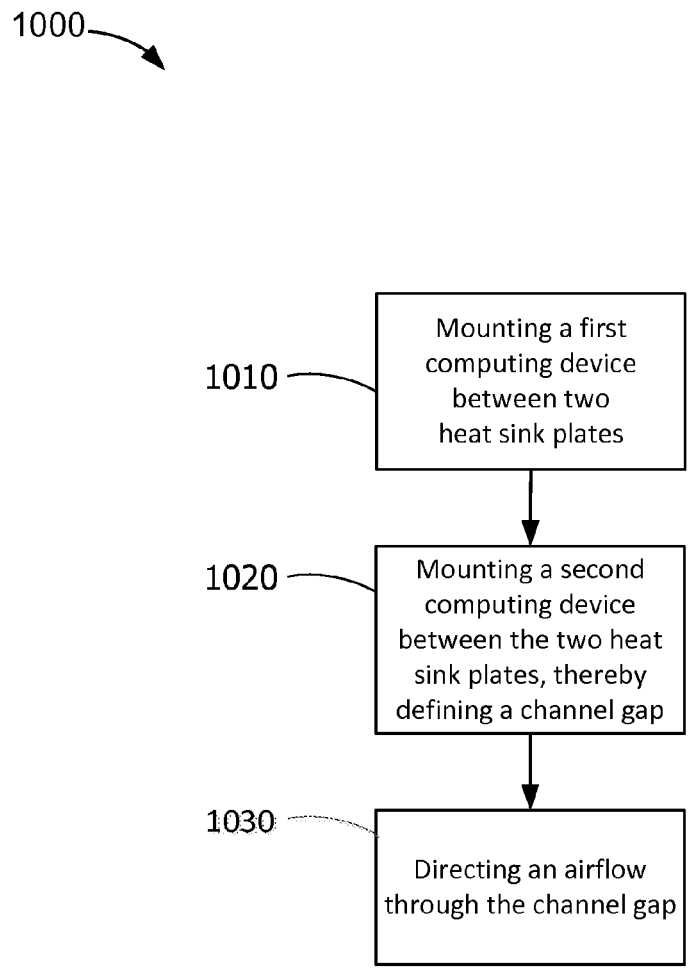

FIG. 10 illustrates an exemplary method 1000 for cooling computing devices such as storage devices 16 within chassis sub-assembly 15 as shown and described above. In the example embodiment, method 1000 includes positioning 1010 a first computing device between an upstream heat sink plate and a downstream heat sink plate such as, for example, device 16c is positioned between plate 20c and 20d (shown in FIGS. 8 and 9). The downstream heat sink plate includes at least one perforation defining a perforation channel across a width of the perforation. For example, plate 20d is the downstream plate in FIGS. 8 and 9, and includes one or more perforations 21a whose width spans across channel gap 30. Each of the computing devices such as, for example, devices 16b and 16a, include an interior side that defines a portion of the channel gap 30 (i.e., a side of the device bordering airflow 28).

In the example embodiment, method 1000 also includes positioning 1020 a second computing device between the upstream heat sink plate and the downstream heat sink plate, such as, for example, positioning computing device 16d between plates 20c and 20d. The first and second computing devices (e.g., 16c and 16d) are positioned such that the interior side of the first computing device and the interior side of the second computing device define a first channel gap (e.g., gap 30, the space within airflow 28 between the two proximate sides of devices 16c and 16d). The channel gap is aligned approximately within the width of the perforation channel.

Further, in the example embodiment, method 1000 includes directing 1030 an airflow through the first channel gap (e.g., gap 30 and/or channel 22), thereby cooling the first and second computing devices. In some embodiments, directing an airflow through the first channel gap further includes directing an airflow through the first channel gap such that the airflow is angled slightly off-center and toward a downstream corner of the first computing device and a portion of the perforation channel proximate the first computing device. For example, and referring to FIG. 9, as airflow 28 passes through perforation 21c, it is directed in an off-parallel vector from axis 27, and directed approximately at the downstream corner of device 16c and at the eddy pocket 33a.

In some embodiments, the width of the at least one perforation is greater than a width of the first channel gap. For example, perforation 21a is wider than channel gap 30 as illustrated, enabling eddy pockets to form partially within one or more sides of the perforation. Further, in some embodiments, one or more perforations are shifted off-center relative to the first channel gap and toward the first device. For example, perforation axis 26a is shifted toward devices 16b and 16c, a distance from channel axis 27. And in some embodiments, directing an airflow through the first channel gap includes directing an airflow into the eddy pool such that the airflow circulates across substantially all of a surface area defined by the eddy pool. For example, after passing perforation 21c, airflow 28 is directed toward eddy pocket 33a.

In some embodiments, method 1000 includes mounting a third computing device and a fourth computing device (e.g., devices 16a and 16b shown in FIG. 9) on a downstream side of the downstream heat sink plate (e.g., plate 20d). The third and fourth computing devices are positioned such that an interior side of the third computing device and an interior side of the fourth computing device define a second channel gap aligned approximately within the width of the perforation channel. As used herein, the term "approximate alignment," as used with respect to a perforation and a channel gap, is used to mean that the channel gap is oriented to be completely within the width of the perforation. Approximate alignment does not necessarily mean axial alignment, as demonstrated by perforation axes 26a and 26c as compared to channel axis 27, as shown in FIG. 9.

In still other embodiments, method 1000 includes positioning a third heat sink plate (not shown) to the downstream side of the third and fourth computing devices (e.g., devices 16a and 16b). The airflow passes through the perforation channel (e.g., the perforation channel created by perforation 21a) angled slightly off-center and toward an opposite side of the second channel gap (e.g. the downstream corner of device 16a). In some embodiments, directing 1030 an airflow includes directing 1030 an airflow through a chassis sub-assembly that includes the first and second computing devices and the upstream and downstream plates. In other embodiments, directing 1030 an airflow includes directing 1030 an airflow through a plurality of airflow channels of a storage enclosure. In still other embodiments, directing 1030 an airflow further includes generating an air pressure differential using one or more computer chassis fans.

The exemplary methods and systems described herein facilitate heat and airflow management in computing devices, such as storage devices. Devices are installed between heat sink plates to facilitate heat transfer from hot devices to the heat sink plates. Devices are positioned such as to create a channel gap between neighboring devices. Heat sink plates include perforations that are aligned approximately with the channel gaps such that air may flow through the channel gaps and the perforations such that an airflow may pass through an entire chassis sub-assembly and an entire chassis. Snaking airflows are created between rows of devices such that small turbulent pockets or eddies are created, thereby facilitating additional transfer of heat from the hot devices and heat sink plates to the airflow. As such, air is heated as it passes through the chassis, thereby removing heat from the chassis.

Exemplary embodiments of methods and systems are described and/or illustrated herein in detail. The exemplary systems and methods are not limited to the specific embodiments described herein, but rather, components of each system and/or steps of each method may be utilized independently and separately from other components and/or method steps described herein. Each component and each method step may also be used in combination with other components and/or method steps.

This written description uses examples to disclose certain embodiments of the present invention, including the best mode, and also to enable any person skilled in the art to practice those certain embodiments, including making and using any devices or systems and performing any incorporated methods. The patentable scope of the present invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A chassis sub-assembly for computing devices comprising:
    a first heat sink plate and a second heat sink plate, wherein the first heat sink plate includes a first plurality of perforations and the second heat sink plate includes a second plurality of perforations; and a first computing device and a second computing device, wherein each of the first and second computing devices is positioned between the first heat sink plate and the second heat sink plate, the first and second computing devices being in contact with both the first and second heat sink plates, and defining a channel gap between the first and second computing devices, wherein at least some of the first and second plurality of perforations are aligned with the channel gap, wherein the first computing device covers a portion of at least one perforation of the first plurality of perforations, wherein the first plurality of perforations, the channel gap, and the second plurality of perforations define an airflow channel, wherein the channel gap defines a longitudinal channel gap axis equidistant between the first and second computing devices and extending horizontally in the direction of the airflow channel, wherein at least one of the first plurality of perforations defines a first perforation axis parallel with the channel gap axis, wherein the first perforation axis is spaced a distance from the channel gap axis in a first direction, and wherein the second plurality of perforations defines a second perforation axis parallel with the longitudinal channel gap axis, wherein the second perforation axis is spaced a second distance from the channel gap axis in a second direction that is opposite the first direction.

2. The chassis sub-assembly of claim 1 further comprising a third computing device positioned downstream and substantially aligned with the first computing device, wherein the first plurality of perforations are downstream from the second plurality of perforations, wherein an eddy pocket is defined by a downstream side of the first computing device, an upstream side of the third computing device, and a perimeter edge, an upper edge, and a lower edge of a first perforation of the first plurality of perforations.

3. The chassis sub-assembly of claim 1 further comprising an airflow entering the channel gap through the second plurality of perforations, the airflow defining an airflow center passing through the second plurality of perforations on a first side of the channel gap axis and directed across the channel gap axis.

4. The chassis sub-assembly of claim 1, wherein the first computing device includes a top surface, a bottom surface, and an inner-side surface, wherein the first computing device is mounted such that the top surface is in contact with the first heat sink plate and the bottom surface is in contact with the second heat sink plate, wherein the inner-side surface is an edge partially defining the channel gap.

5. The chassis sub-assembly of claim 1, wherein each perforation of the first plurality of perforations defines an aperture through a thickness of the first heat sink and having an aperture width greater than a channel gap width defined by the channel gap between the first and second computing devices.

6. The chassis sub-assembly of claim 1, wherein the first plurality of perforations are aligned in a column defining a left side edge and a right side edge, wherein the channel gap is aligned such as to be approximately entirely within the boundaries of the left side edge and the right side edge of the column.

7. The chassis sub-assembly of claim 1, wherein the first and second computing devices are disk storage devices, wherein the first heat sink plate further comprises a plurality of mounting holes and a fan coupled to the first heat sink plate using the mounting holes.

8. The chassis sub-assembly of claim 1, wherein the first plurality of perforations comprise a plurality of horizontally elongate perforations arranged in a column on the first heat sink plate.

9. A computer enclosure for computing devices comprising:

an enclosure case;

a first and a second chassis sub-assembly positioned within the enclosure case, each chassis sub-assembly comprising a plurality of drives defining an intra-assembly airflow channel spanning a length of each chassis sub-assembly and aligning such as to define an inter-assembly airflow channel through both the first and second chassis sub-assemblies; and one or more fans positioned within the enclosure case and approximately aligned with an axis of the inter-assembly airflow channel, wherein said first chassis sub-assembly further comprises:

a plurality of heat sink plates each including a plurality of perforations, wherein first and second heat sink plates of the plurality of heat sink plates are configured to receive a plurality of computing devices therebetween such that at least one computing device of the plurality of computing devices covers a portion of at least one perforation of the plurality of perforations, wherein the first heat sink plate includes a first plurality of perforations and the second heat sink plate includes a second plurality of perforations, wherein a channel gap is defined between a first and a second computing device of the plurality of computing devices, wherein the channel gap defines a longitudinal channel gap axis equidistant between the first and second computing devices and extending horizontally in the direction of the inter-assembly airflow channel, wherein at least one of the first plurality of perforations defines a first perforation axis parallel with the channel gap axis, wherein the first perforation axis is spaced a distance from the channel gap axis in a first direction, and wherein the second plurality of perforations defines a second perforation axis parallel with the longitudinal channel gap axis, wherein the second perforation axis is spaced a second distance from the channel gap axis in a second direction that is opposite the first direction.

10. The computer enclosure of claim 9, wherein the plurality of computing devices are disk storage devices mounted vertically within the chassis sub-assembly, wherein the computing devices define a plurality of intra-assembly airflow channels.

11. A method for cooling computing devices, said method comprising:

positioning a first computing device between an upstream heat sink plate and a downstream heat sink plate, wherein the downstream heat sink plate includes at least one first perforation defining a perforation channel across a width of the first perforation, and wherein the upstream heat sink plate includes at least one second perforation, the first computing device including an interior side and covering a portion of the first perforation;

positioning a second computing device between the upstream heat sink plate and the downstream heat sink plate, the second computing device including an interior side, wherein the first and second computing devices are mounted such that the interior side of the first computing device and the interior side of the second computing device define a first channel gap, and wherein the channel gap is aligned approximately within the width of the perforation channel; and directing an airflow through the first channel gap, thereby cooling the first and second computing devices, wherein the first channel gap, the at least one first perforation, and the at least one second perforation define an airflow channel, wherein the first channel gap defines a longitudinal channel gap axis equidistant between the first and second computing devices and extending horizontally in the direction of the airflow channel, wherein the at least one first perforation defines a first perforation axis parallel with the channel gap axis, wherein the first perforation axis is spaced a distance from the channel gap axis in a first direction, and wherein the at least one second perforation defines a second perforation axis parallel with the longitudinal channel gap axis, wherein the second perforation axis is spaced a second distance from the channel gap axis in a second direction that is opposite the first direction.

12. The method of claim 11, wherein directing an airflow through the first channel gap further includes directing an airflow through the first channel gap such that the airflow is angled slightly off-center and toward a downstream corner of the first computing device and a portion of the perforation channel proximate the first computing device.

13. The method of claim 12, wherein the width of the at least one first perforation is greater than a width of the first channel gap, wherein the at least one first perforation is shifted off-center relative to the first channel gap and toward the first device, wherein directing an airflow through the first channel gap includes directing an airflow into the eddy pool such that the airflow circulates across substantially all of a surface area defined by the eddy pool.

14. The method of claim 11 further comprising:

mounting a third computing device and a fourth computing device on a downstream side of the downstream heat sink plate, wherein the third and fourth computing devices are mounted such that an interior side of the third computing device and an interior side of the fourth computing device define a second channel gap aligned approximately within the width of the perforation channel; and mounting a third heat sink plate to the downstream side of the third and fourth computing devices, wherein the airflow passes through the perforation channel angled slightly off-center and toward an opposite side of the second channel gap.

15. The method of claim 11 further comprising directing an airflow through a chassis sub-assembly that includes the first and second computing devices and the upstream and downstream plates.

16. The method of claim 11 further comprising directing an airflow through a plurality of airflow channels of a storage enclosure.

17. The method of claim 11, wherein directing an airflow further comprises generating an air pressure differential using one or more computer chassis fans.

* * * * *